Patented Feb. 1, 1949

2,460,733

UNITED STATES PATENT OFFICE 2,460,733

DIAMINO COMPOUND

Herman A. Bruson, Rydal, and Warren D. Niederhauser, Philadelphia, Pa., assignors, by mesne assignments, to Rohm & Haas Company, Philadelphia, Pa., a corporation of Delaware No Drawing. Application June 13, 1945,
Serial No. 599,302

1 Claim. (Cl. 260—583)

This invention relates to a new composition of matter, namely, the saturated primary diamine resulting from the catalytic reduction of the dimer of octadecadienonitrile.

In copending application Serial No. 592,264, filed May 5, 1945, now Patent No. 2,435,553, patented February 3, 1948, of which the present application is a continuation-in-part, it is shown that octadecadienic acid (obtained, for example, from the dehydration of castor oil or of ricinoleic acid) gives substantial yields of dimeric octadecadienonitrile upon reaction with ammonia at 280° to 400° C., or preferably at 280° C. to 360° C. Dimeric octadecadienonitrile is an unsaturated, pale-yellow high-boiling liquid having the formula

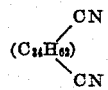

According to this invention, the two double bonds as well as the two cyano groups of dimeric octadecadienonitrile are catalytically reduced to the saturated primary diamine

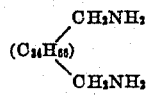

by the uptake of twelve atoms of hydrogen per mol. For this purpose, the dimeric octadecadienonitrile is reacted under pressure with hydrogen at temperatures from 50° C. to 170° C. in the presence of a finely divided hydrogenation catalyst, such as nickel, cobalt, or platinum, advantageously in the presence of ammonia to inhibit the formation of secondary or tertiary amines; and the completely saturated primary diamine is isolated therefrom by either distillation or extraction.

A mixture of 52 parts of dimeric octadecadienonitrile, 20 parts of liquid ammonia, 80 parts of ethanol, and 5 parts of Raney nickel catalyst was agitated in a steel autoclave in the presence of hydrogen at a pressure of 100–150 atmospheres for four hours at 120°–130° C. The product was filtered from the catalyst. The alcohol was removed on the steam bath under reduced pressure to give 52 parts of pale-yellow oil. This oil boils at 230°–250° C. at 0.01 mm. in the molecular still and possesses a refractive index, $n_D^{22}$, of 1.4874. Its empirical formula is $C_{36}H_{74}N_2$. It contains two primary amino groups. It is useful as a component for the preparation of synthetic resins.

We claim:

As a new composition of matter, a saturated diamine having the formula $C_{36}H_{74}N_2$, containing two primary amine groups, boiling at 230°–250° C. at 0.01 mm., and being the product obtained by treating dimerized octadecadienonitrile with hydrogen under pressure at 50° to 170° C. in the presence of a hydrogenation catalyst.

HERMAN A. BRUSON.
WARREN D. NIEDERHAUSER.

REFERENCES CITED

The following references are of record in the file of this patent:

UNITED STATES PATENTS

| Number | Name | Date |
|---|---|---|
| 2,037,389 | Nicodemus et al. | Apr. 14, 1936 |
| 2,177,619 | Nicodemus et al. | Oct. 24, 1939 |

FOREIGN PATENTS

| Number | Country | Date |
|---|---|---|
| 609,996 | Germany | July 31, 1936 |